United States Patent [19]
Giasante

[11] 3,820,278
[45] June 28, 1974

[54] PASTEURIZATION ATMOSPHERE CONTROL SYSTEM

[76] Inventor: Joseph A. Giasante, 720 Willow St., Pottstown, Pa. 19464

[22] Filed: Dec. 12, 1972

[21] Appl. No.: 314,449

[52] U.S. Cl.......................... 47/1.1, 165/16, 165/21
[51] Int. Cl........................................ A01g 1/04
[58] Field of Search............ 236/2; 47/1.1; 165/20, 165/21, 22, 26, 28, 50, 31, 16

[56] References Cited
UNITED STATES PATENTS

| | | | |
|---|---|---|---|
| 2,547,657 | 4/1951 | Olsen | 165/20 X |
| 2,715,515 | 8/1955 | Stair | 165/50 X |
| 2,872,858 | 2/1959 | Caldwell | 165/16 X |
| 3,478,817 | 11/1969 | Shaw | 165/21 |
| 3,717,953 | 2/1973 | Kuhn et al. | 47/1.1 |

Primary Examiner—Manuel A. Antonakas

[57] ABSTRACT

Pasteurization rooms for the pasteurization of compost in the forced growing of commercial cultivated mushrooms include a fresh air supply system and duct work, supply air fan, return air fan, room supply and return duct systems, by-pass and relief air ducts, filtration equipment, high and low pressure steam systems, cooling systems, automatic and manual temperature and humidity controls, and a compost temperature measurement system for cook-out.

8 Claims, 7 Drawing Figures

PASTEURIZATION ATMOSPHERE CONTROL SYSTEM

BACKGROUND OF THE INVENTION

This invention relates to systems for growing mushrooms, and to methods and means for developing and maintaining ideal environmental conditions of temperature and humidity throughout the various stages in the forced growing of commercially cultivated mushrooms, especially of the species *Agricus Bisporus*.

The present invention relates particularly to the development and maintenance of ideal environmental conditions of temperature and humidity throughout various cycles of pasteurization of the soil. One application Ser. No. 319,229, filed Dec. 29, 1972 substantially concurrently herewith relate to methods and means for developing and maintaining ideal environmental conditions of temperature and humidity throughout the various cycles of growing of the mushrooms.

The cultivated mushroom has been raised by man since early Roman times for both personal and commercial use. Prior art commercial methods of raising mushrooms involve utilizing buildings, generally constructed of concrete blocks, within which the beds of mushrooms are placed, with the ceiling of the building provided with manually dampered vents for ventilation control. Ventilation during composting is accomplished, according to prior methods, by manually manipulating the dampered vents and by adjusting the position of entrance doors in the other walls of the building. In some cases, mechanical exhaust fans have been used in the rear wall to exhaust air from the building. The general procedures heretofore commercially used have required large quantities of low cost labor throughout the mushroom-raising cycle.

Heretofore, methods of raising mushrooms in actual practice have been more of an art than a science. Much of the operational procedure heretofore used has been determined by a master grower with respect to ventilation, elimination of ammonia gas, the completion of the composting phase, spawning, casing, growing, liberation of carbon dioxide, control of insects and pests, and other factors. These items are frequently controlled as a function of the master growers knowledge and experience. In all cases, the purpose of the practices heretofore used has been to provide the most ideal conditions for the mushroom to grow with the equipment heretofore used.

The trend to mechanization and automation in the industry has been very slow. Until very recent times (1962), the mushroom industry provided but a single crop per year. Since 1962, it is not unusual to find growers producing two crops per year. The step-up from one crop to two crops per year has been regarded as a very significant development.

Based upon data issued by the U.S. Department of Commerce and The American Mushroom Institute, there is indication that the per capita consumption of mushrooms is increasing. It has been forecast, for example, that the figure of 1.12 lbs. of mushrooms consumed per person in 1968 will be increased to 2.07 lbs. per person by 1985.

SUMMARY OF THE PRESENT INVENTION

The purpose of the present invention is to provide methods and means for automatically controlling and maintaining the environmental conditions in which mushrooms are grown, with a particular objective of increasing the number of crops per year from two to a number significantly larger than two, ideally as high as seven crops per year.

The invention disclosed in the present application is directed particularly to the provision of methods and means for controlling the pasteurization phase. This phase occurs within the mushroom house and begins when the beds are filled with compost. The temperature must be rigidly controlled with the objective of eliminating the ammonia and achieving pasteurization of the compost. The ammonia can be eliminated by control of the environment. Certain thermophilic (heat-loving) micro-organisms absorb ammonia into their bodies as they grow. These organisms can grow between 95° and 145° F. but optimally grow between 115° and 135° F. The climate most suited for the growth requirements of these organisms requires control of compost temperature, control of oxygen to support microbial growth, and the control of water and nutrients in the compost.

The term pasteurization as used in this application refers to the selective killing of micro-organisms and pests which are known to compete with or injure the commercial mushroom. Pasteurization is achieved by raising the air temperature to 140° F. with steam and holding this temperature a minimum of 2 hours. Every location within the pasteurization room must be subjected to this high temperature for a specified time if the pasteurization is to be complete. Partial or incomplete pasteurization is very unsatisfactory and can be as bad as, or worse than, no pasteurization at all.

Heat is produced within the compost during the pasteurization phase. The amount of heat generated depends on microbial activity, and microbial activity is a function of: (1) nutritive value of the compost, (2) the amount of the compost, and (3) the time during the pasteurization phase at which measurements are made. Heat generating constants have not been determined during the pasteurization phase and the amount of heat exchange required to keep the compost in the desired temperature range must be estimated.

Ventilation during the pasteurization phase is required to maintain an oxygen level capable of sustaining aerobic life. The ventilation should not be less than 16 percent. Oxygen is required in the pasteurization room, but more importantly oxygen is required within the mass of compost being subjected to the pasteurization phase. Anaerobic (oxygen-less) conditions harm the compost. Oxygen deficiencies favor micro-organisms which directly or indirectly change the compost. This change decreases suitability of the compost for mushroom growth.

In order to achieve the extremes of operational conditions that will exist in a pasteurization room, each room preferably should have such equipment as a supply air fan, a return air fan, supply and return duct systems, by-pass and relief air ducts, ventilation air supply systems and duct work, filtration equipment, high and low pressure steam system, a cooling system, automatic and manual override temperature and humidity controls, and a compost temperature measurement and recording system for cook-out.

DETAILED DESCRIPTION OF THE DRAWINGS

Figure 1:
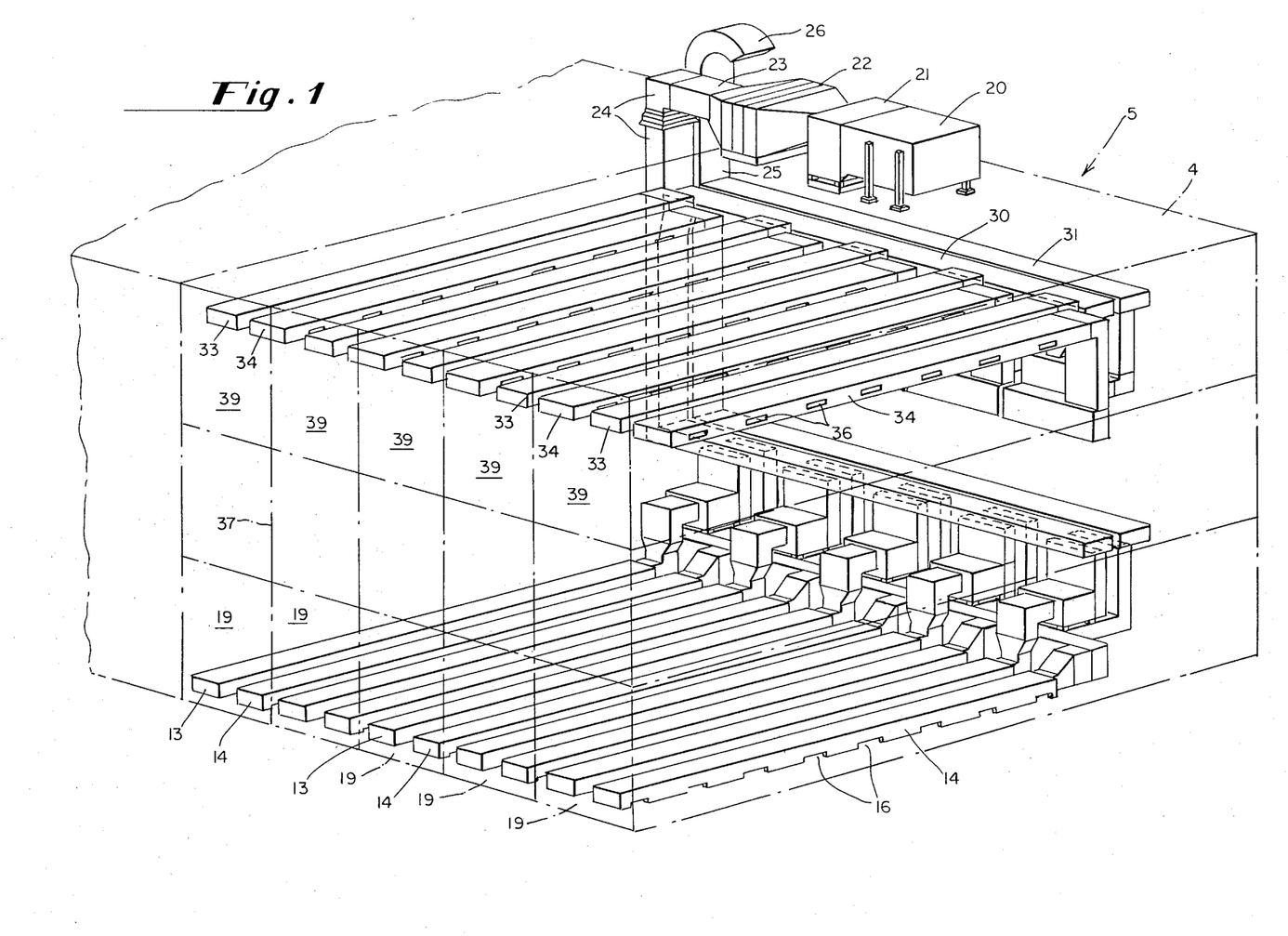
FIG. 1 is a schematic perspective view of typical first floor and third floor pasteurization rooms with a ventilation air supply system on the roof.

Referring first to FIG. 1, the ventilation air supply system is mounted on the roof 4 of the building 5 and includes a motor-driven inlet vortex damper in a housing 20, a ventilation air supply fan in a housing 21, a high efficiency filter system in a housing 22, a pressure sensing transmitter in a duct 23, and a main supply air duct 24 leading down to the pasteurization areas.

The pasteurization areas comprise: (1) A plurality of ground floor rooms 19 and (2) A plurality of third floor rooms 39.

Figure 2:
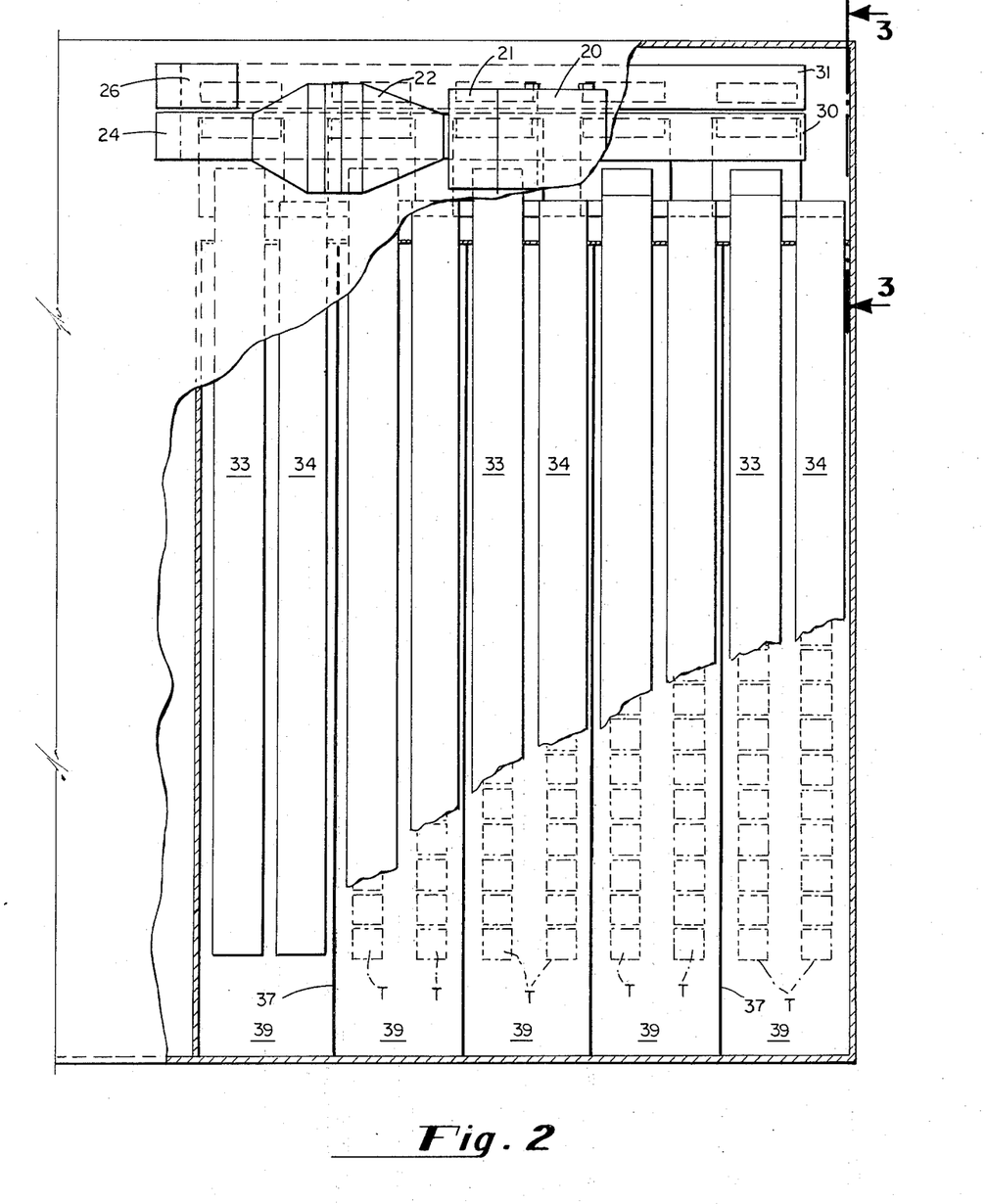
FIG. 2 is a plan view of the structure of FIG. 1, partly cut away to show several levels.
Figure 3:
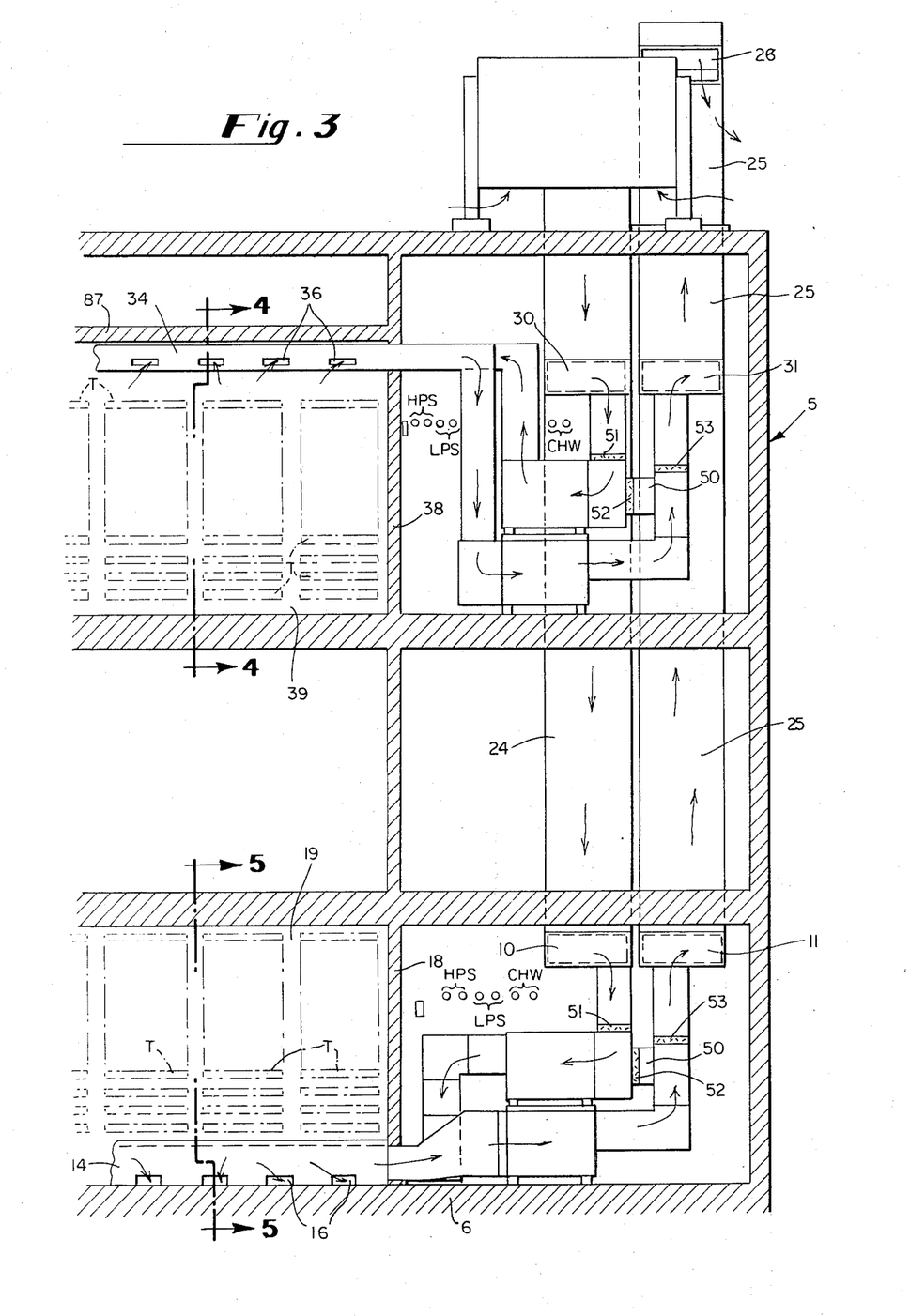
FIG. 3 is an elevational view looking along the line 3—3 of FIG. 2.

The supply-air and return-air duct systems for the third floor pasteurization rooms 39 include a lateral supply-air feed duct 30 which, as seen in FIGS. 1, 2 and 3, is located below the ventilation air supply system which, as just described, is located on the roof 4. Positioned alongside of lateral supply-air feed duct 30 is a lateral return-air duct 31 for returning air to a main return duct 25 which leads upwardly to a discharge gooseneck 26 on the roof 4 of the building. As seen best in FIG. 3, both of the lateral ducts 30 and 31 are located outside of the third floor pasteurization rooms 39 in a vestibule area 32 which extends along and is common to all of the pasteurization rooms 39 and is separated therefrom by an insulated wall 38.

Also located in common area 32 are various ducts and equipments, later described, which connect the lateral supply-air feed duct 30 with a series of supply-air distribution ducts 33, one such distribution duct 33 being located on the ceiling 87 of each third floor pasteurization room 39.

In FIG. 1, building 5 is illustrated as having five separate pasteurization rooms 39 on the third floor and five separate pasteurization rooms 19 on the ground floor. It should be understood, however, that the building may contain some other number of pasteurization rooms, larger or smaller than five, so far as the invention is concerned. Each of the pasteurization rooms 39 on the third floor are separated from each other by heat-insulated walls 37. The same is true of the pasteurization rooms 19 on the ground floor.

Located in parallel relation with each supply-air distribution duct 33, in each third-floor pasteurization room 39, is a return-air duct 34 which is connected, through various equipments to be described, to the lateral return-air duct 31.

Referring again to FIG. 3, the supply-air and return-air duct systems for the ground floor pasteurization room 19 include a lateral supply-air feed duct 10 and a lateral return-air duct 11. These ducts 10 and 11, like lateral ducts 30 and 31, are located in a common vestibule, designated 12 which extends along and is common to all of the ground-floor pasteurization rooms 19 and is separated therefrom by an insulated wall 18.

Also located in common ground-floor area 12 are various ducts and equipments, later described, which connect lateral supply-air feed duct 10 with a series of supply-air distribution ducts 13, one such distribution duct 13 being located on the floor 6 of each ground-floor pasteurization room 19.

Located on parallel relation with each supply-air distribution duct 13, in each ground-floor pasteurization room 19, is a return-air duct 14 which is connected, through various equipments to be described, to the lateral return-air duct 11.

Lateral supply-air feed duct 10 is connected to, and supplied with air from, vertical duct 24, and lateral return-air duct 11 is connected to, and returns air to, vertical duct 25 leading up to the discharge gooseneck 26.

The supply-air distribution ducts 33 and 13 for the third-floor and ground-floor pasteurization rooms, respectively, preferably extend the full lengths of the rooms, as do the return ducts 34 and 14. The ducts 33 and 34 on the ceiling of the third-floor rooms 39 may preferably be formed of aluminum sheet. The ducts 13 and 14 on the floor of the ground-floor rooms 19, may preferably be formed of reinforced concrete, as seen best in FIG. 5. Each of the third-floor supply-air distribution ducts 33 have a relatively large number of closely-spaced openings 35 for discharging supply-air at low velocity, and with good distribution, into the third-foor pasteurization rooms 39. Similarly, each of the return ducts 34 have a large number of closely spaced openings 36 for collecting the air to be returned to the system. Each of the ground-floor supply-air distribution ducts 13 have a relatively large number of spaced openings 15 in the sidewall of the concrete duct for distributing supply air at low velocity, and with good distribution, into the ground-floor pasteurization room 19. Similarly, each of the return ducts 14 have a large number of openings 16 for collecting the air to be returned to the system.

Figure 4:
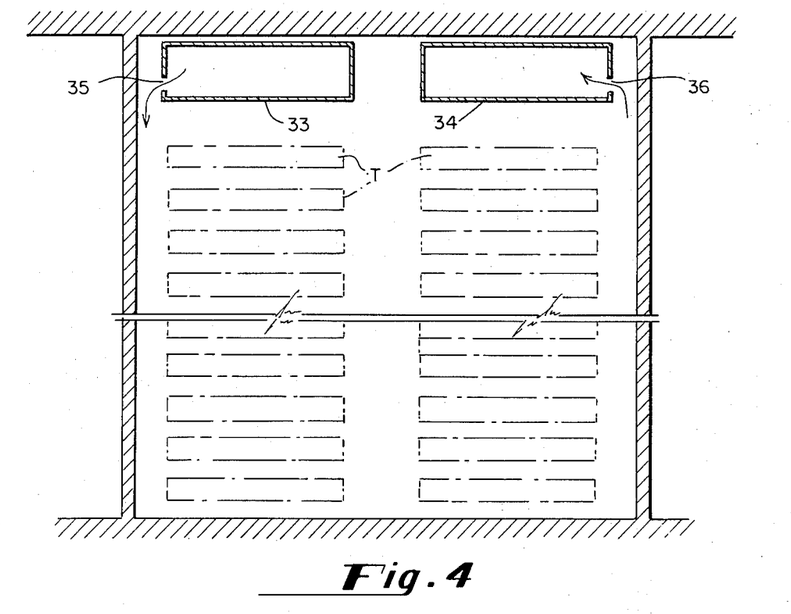
FIG. 4 is an elevational view looking along the line 4—4 of FIG. 3.
Figure 5:
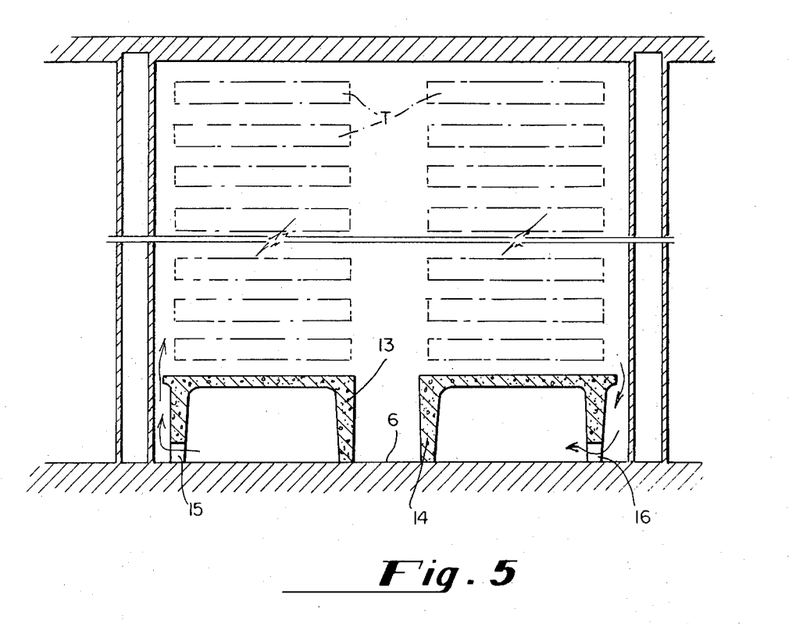
FIG. 5 is an elevational view looking along the line 5—5 of FIG. 3.

Each of the pasteurization rooms 39 and 19 will contain stacks of typical mushroom trays T of generally square or rectangular shape, as indicated in phantom in FIGS. 3 – 5.

As previously indicated, each of the third-floor supply-air distribution ducts 33 is connected to the common lateral air supply duct 30 which runs along the common vestibule 32 at the ends of the five (or other number of) third-floor pasteurization rooms. The connections between each distribution duct 33 and lateral supply duct 30 are identical, or substantially identical, and accordingly, it will be necessary to describe but one of the connections. One such connection is seen in FIG. 3. Also seen in FIG. 3, are the connections between the third-floor air-return duct 34 and the common lateral air-return duct 31; the connections between the ground-floor supply-air distribution duct 13 and the common lateral air-supply duct 10 located in the ground-floor vestibule 12; and the connections between the ground-floor air-return duct 14 and the common lateral air-return duct 11.

Referring again to FIG. 3, the connections between the third-floor common lateral supply-air duct 30 and the third-floor supply-air distribution duct 33 may be seen by following the arrows indicating the flow path of the supply air. It will be seen that the supply air passes downwardly through a damper 51 located ahead of a return by-pass duct 50 which inter-connects the return-air and supply-air systems. A damper 52 is positioned in by-pass duct 50. Beyond the junction with return-air by-pass duct 50, the supply-air passes through connecting ducts containing, in sequence, a chilled-water cooling coil, a supply-air fan, and two sets of steam jets, one for low-pressure steam (15 p.s.i.g.) and the other for high-pressure steam (120 p.s.i.g.). The chilled water supply and return pipes are indicated in FIG. 3, designated CHW. The steam supply and return pipes are also indicated in FIG. 3, designated HPS and LPS for high-pressure steam and low-pressure steam, respectively. The supply air then passes into the room distribution duct 33.

The return air from room duct 34 passes through connecting ducts containing a return-air fan located ahead of the by-pass duct 50. The exhaust air which does not return to the system through the by-pass duct 50 passes through a damper 53 into the common lateral air return duct 31.

The ground-floor connecting ducts, and the equipment contained therein, which inter-connect common duct 10 and room distribution duct 13, and which inter-connect room return duct 14 and common return duct 11, are substantially similar to the third-floor connecting duct structure just described, and the same reference numerals have been used for the corresponding by-pass duct and filters in the ground-floor inter-connecting structures.

Figure 7:
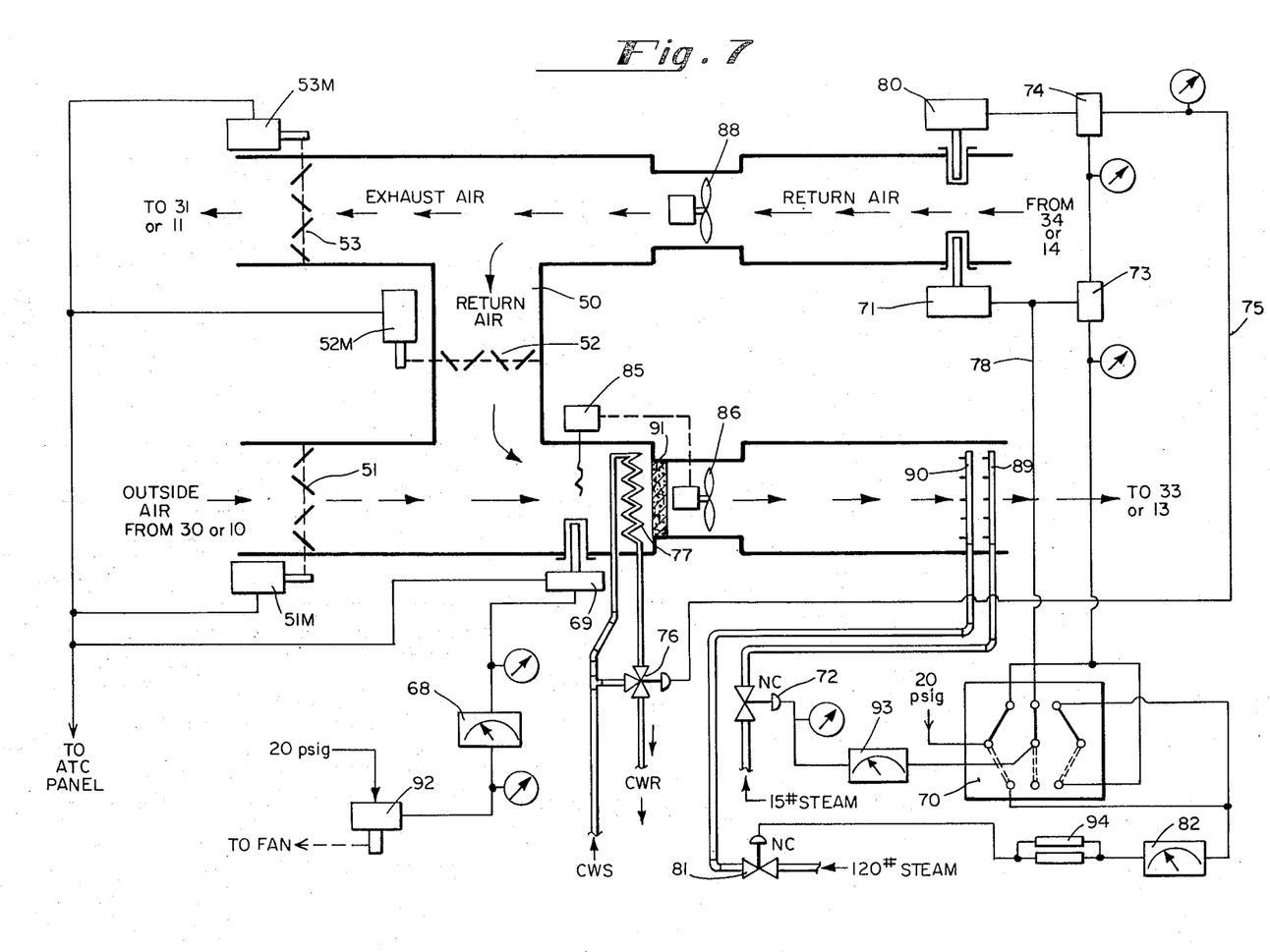
FIG. 7 is a schematic diagram showing a typical damper control system, and typical automatic temperature and humidity control systems for a single pasteurization room.

The equipments in the inter-connecting systems between the individual room ducts and the common vestibule ducts, for both the third-floor and ground-floor installations, just described with reference to FIG. 3, are shown schematically in FIG. 7, together with the more important elements of the control system. The control system is largely pneumatic, but could be electric or electronic, using equivalent components. In FIG. 7, pneumatic lines are shown in thin solid lines. The ducts are indicated by heavy solid lines. Piping, for steam and water, are indicated by dual lines. Electrical connections are indicated by dashed lines. Some mechanical links are also indicated by dashed lines, notably at the dampers.

Figure 6:
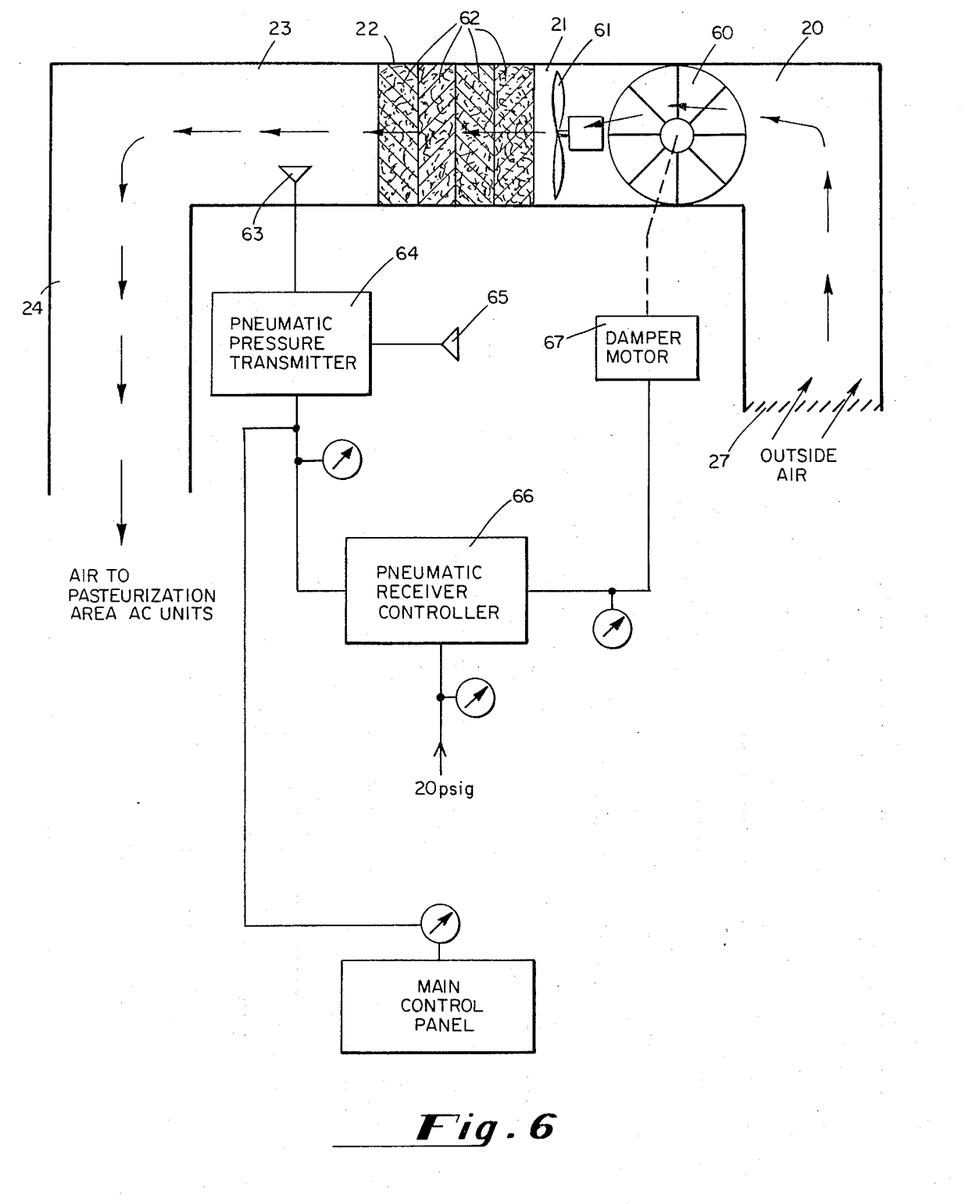
FIG. 6 is a schematic diagram of a typical ventilation air make-up system for the pasteurization rooms.

In FIG. 6, the control system for the primary air supply is schematically indicated. Here, as in FIG. 7, pneumatic lines are indicated by thin solid lines and electrical connections by dashed lines.

Returning to FIG. 1, and as described previously, mounted on the roof 4 of the building 5 is a housing 21 containing a motor-driven double-inlet vortex damper, and a ventilation supply fan, a housing 22 containing a high efficiency filter bank, a duct 23 containing a static pressure sensor and transmitter. Duct 23 connects to a duct 24 leading down to the pasteurization areas. These structures are shown schematically in FIG. 6, together with the ventilation control connections.

Referring now to FIG. 6, ventilation is provided by outside air drawn in through a screen 27 which will have a size that is a function of the number of rooms 39 and 19. The air is drawn in through a pneumatically controlled double-inlet vortex damper 60, and is then driven by a ventilation fan 61 through a high efficiency filter bank 62 into duct 23. The ventilation system is required for several reasons. One is to provide oxygen for pasteurization. Another is to remove ammonia gas. The percentage of ventilation or outside supply air required is quite variable and may vary between 10,000 and 42,000 c.f.m. for 10 pasteurization rooms. Within duct 23 is the sensor 63 of the pneumatic pressure transmitter 64. The pneumatic pressure transmitter 64 also has a sensor 65 for sensing atmospheric pressure. The pressure signals developed by the pneumatic pressure transmitter 64 are transmitted to the pneumatic receiver controller 66. Connected to controller 66 is a source of air pressure, indicated in FIG. 6 as 20 p.s.i.g. The pneumatic receiver controller 66 is coupled to a pneumatic damper motor 67 and modulates the double-inlet vortex damper 60 to maintain a constant discharge static pressure in duct 23. This discharge static pressure is indicated on a main control panel in a control room, preferably located on the second floor of the building.

Reference is now made to FIG. 7 which shows schematically the connections between the common ducts 30, 31, 10, 11 and the individual room ducts 33, 34, 13, 14. When the primary supply air fan 61 is off, the outdoor air damper 51 and the exhaust air damper 53 in each of the individual inter-connections are both closed and the damper 52 in the return air by-pass duct 50 is open. All valves are closed.

When the ventilation supply air fan 61 is started, the panel-mounted manual positioning switch 68, functions through a mixed air-low limit thermostat 69 to position the outdoor air dampers 51, the exhaust air dampers 53, and the return air dampers 52, as required by the operating engineer, to maintain a certain percentage of ventilation air for the particular stages of the pasteurization cycle. These dampers are actuated and moved through pneumatic damper motors 51M, 52M and 53M, shown in FIG. 7.

A selector switch 70, located on the control panel enables the operator to manually select either the "normal" or the "cook-out" modes of operation. In FIG. 7, in the pneumatic selector switch 70, the switch connections for the "normal" mode of operation are indicated in solid lines and the switch connections for the "cook-out" mode are shown in phantom.

With selector switch 70 indexed to "normal" position, the panel-mounted pneumatic temperature controller 71 senses the temperature of the air returning from the room return ducts 34 or 14 and, by way of lead 78 and selector switch 70, modulates the normally closed low-pressure steam valve 72. The pneumatic temperature controller 71 also modulates, by way of pneumatic relays 73 and 74 and lead 75, the chilled-water valve 75 which controls the flow of chilled water through the cooling coil 77 located in the room supply-air duct connection between common supply duct 30 or 10 and the individual room distribution ducts 33 or 13. The pneumatic temperature controller 71 modulates the low-pressure steam valve 72 and the chilled-water valve 76 in sequence, to maintain the desired temperature set for the air returning from the room ducts 34 or 14. A freeze detection thermostat 85 set, for example, at 36° F, will shut off the supply-air fan 86, and close the dampers 51 and 53 if the mixed air drops below the set point, 36° F. The freezestat 85 is located on the entering side of the cooling coil 77.

Also located in the return air duct connection from the room return ducts 34 or 14, at approximately the location of the sensor of the temperature controller 71, is the sensing tip of an adjustable high-limit pneumatic thermostat 80, which may be set at the prevailing outside air temperature, or, for example, at 95° F. A manual positioning switch 79 on the control panel permits the operator to manually over-ride the pneumatic temperature controller 71 and to limit the opening of the low-pressure steam valve 72. The high-limit pneumatic thermostat 80 which senses the temperature of the air returning from the room return ducts 34 or 14 will over-ride the pneumatic temperature controller 71 and close the chilled-water valve 76 if the return air temperature exceeds its set point, which, in the present example, has been indicated as 95° F, or the prevailing outside air temperature. This is because it is desired to use the outside air, even though its temperature is as high as 95° F, to cool down the pasteurization rooms which may be as high as 135° F, as a result of the cook-out phase. At 95° F, or below the set point of high-limit thermostat 80, the chilled water coil 77 is used to cool down further the room temperature to 80° F. in preparation for spawning.

A further explanation of what has just been said may be desirable. Cook-out occurs periodically for each room. Cook-out covers a period of 5 days, at 35 day intervals. When the pasteurization rooms are in the cook-out mode, their internal temperatures are of the order of 125°–140° F, at 96 percent relative humidity, or more. These temperatures must be maintained in the pasteurization room during cook-out, irrespective of the outdoor temperature. Since the next step, after cook-out, is to spawn the compost at 80° F, it is necessary in all seasons, including summer and winter, to cool the pasteurization rooms down to 80° F. after the cook-out. This cooling is done by using outside air to the extent possible, before calling on the refrigeration system. In summer, when the outside air may be as high as 95° F. or as low as 80° F, it will only be possible to cool the pasteurization room down from the cook-out temperature (125°–140° F.) to the prevailing outside air temperature. The system is so arranged that the valve 76 is controlled to bypass the cooling coil 77 until the temperature of the room return air is down to the set point of the adjustable high-limit thermostat 80. This instrument is set by the operating engineer at the prevailing outside temperature. It will be appreciated that if the system is not designed to employ the outside air for "free" cooling, the refrigeration equipment would have to cool the rooms in winter as well as in summer, resulting in a considerable increase of installed refrigeration capacity with a considerably larger initial investment and annual owing and operating costs.

In the "normal" mode of operation, the high-pressure steam valve 81 is closed. When the system is indexed to the "cook-out" mode, the switch connections at the pneumatic selector switch 70 are as indicated in phantom in FIG. 7. In this mode, the normally closed high pressure steam valve 81 is under the control of the manual positioning switch 82 located on the control panel on the second floor of the building. In this "cook-out" mode, the low pressure steam valve 72 and the chilled-water valve 76 are both closed.

SUMMARY

The new mechanical system and methods described herein for controlling the environmental conditions for the pasteurization of compost in mushroom growing will now be summarized:

What may be referred to as the second phase of composting occurs within the mushroom house when the beds or trays are filled with compost. Thereafter, the temperature must be rigidly controlled with the goal of eliminating the ammonia and achieving pasteurization of the compost. As previously defined herein, pasteurization is the selective killing of micro-organisms and pests known to compete with or injure the commercial mushroom. Pasteurization is achieved by raising the air temperature to a temperature of the order of 140° F. using live steam heat and holding this temperature for a minimum selected period of time, such as 2 hours. If pasteurization is to be complete, every location within the pasteurization room must be subjected to the desired temperature.

Heat is produced within the compost during the second phase of composting. The amount of heat generated depends on microbial activity. The amount of heat exchange required to keep the compost in the desired temperature range must be estimated.

Ventilation during the second phase of composting is required to maintain an oxygen level capable of sustaining aerobic life. Anaerobic (oxygen-less) conditions harm the compost, since oxygen deficiencies favor micro-organisms which directly or indirectly change the compost and decrease the suitability of the compost for mushroom growth.

The room air in the pasteurization room should be recirculated while maintaining a high relative humidity during the spawn run. This environment favors the growth of the spawn throughout the compost. Growing mycelium produces volatiles which do not hinder the growth of the mushroom spawn but retard competition from undesirable fungi and bacteria. The humidity should be kept at 90 percent or higher to minimize the loss of water from the compost. Preventing moisture loss at this stage of the crop contributes to better quality mushrooms. The compost temperature is maintained at a set temperature (74° F.) for the spawn run. As the compost is colonized, the growth of the fungus will cause the release of heat. This heat must be dissipated if the ideal temperature for spawn growth is to be maintained. The magnitude of heat produced during the spawn run is substantially lower than that encountered during the second phase of composting. The heat generated during the spawn run can injure the mycelium if the compost temperature exceeds 80° F, and it can cause death of the mycelium at about 100° F.

Once the compost has been completely colonized by spawn, a layer of loam soil is placed on the compost to a depth of 1 to 1.5 inches. This is called casing. About two to three weeks elapse between the placement of the casing and the appearance of mushrooms for picking. Room temperature should be maintained at a selected temperature such as 74° F. for up to 1 week after casing. Thereafter, the temperature is lowered a degree or two per day until the desired temperature of 58° F. for croping is reached. Recirculated air is desired for the first few days after casing. Once fresh air is introduced into the room, the carbon dioxide ($CO_2$) level at the surface of the casing must not exceed 0.1 percent.

The relative humidity of the air should be 90 percent or higher to prevent drying of the soil before mushrooms form.

The pasteurization rooms where the second phase of composting and spawn growing occur should be maintained under positive air pressure. This prevents the entry of wingless airborne particles through any openings there may be in the building. Use of filtered air and pressurized rooms keep the crop free of harmful pests.

Pasteurization rooms may be constructed as "on grade" or "elevated." In the present application, these two levels of pasteurization rooms have been referred to as "ground-level" and "third-floor" rooms. The filling of the beds or trays with compost is done on the second floor, and the filled trays are then transferred to the ground and third floors by any suitable form of conveyor system. As indicated previously, the control panels are also located on the second floor.

As seen in FIGS. 2, 3 and 4 of the present application, each pasteurization room has two rows of stacked trays, there being one row of trays along each wall of the room, with a center aisle between the trays. Each room may contain of the order of 280 to 300 trays, with each tray containing of the order of 2.4 square meters of compost.

To achieve the extremes of environmental conditions that are required in the pasteurization rooms, each room has its own separate equipments. These equipments are shown schematically in FIG. 7, and include a room supply-air fan 86, a room return-air fan 88, a room air-supply duct 33 or 13, a room air-return duct 34 or 14, a by-pass or relief duct 50, a common fresh-air supply system 30 or 10, a common return duct system 31 or 11, a high efficiency filter 91 preferably rated at 95 percent at 0.5 microns, a low-pressure steam system including jets 89, a high-pressure steam system including jets 90, automatic temperature controls including elements 69, 71 and 80, and panel-mounted manual humidity controls including elements 68, 82 and 93. These controls operate briefly as follows: Starting up the room supply-air unit energizes the control system and through an electro-pneumatic valve 92 passes air to a panel-mounted manual gradual positioning switch 68. This positioning switch 68, operating through a mixed-air temperature control 69 having its sensing bulb in the mixed-air supply stream, positions the dampers 51, 53 and 52 which control the supply of outdoor air to the room, the exhaust of air from the room, and the relief or by-pass of return-air back into the room. When the room supply-air fan 86 is off, the outdoor-air exhaust-air dampers 51 and 53 are closed, and the relief or recirculating damper 52 is open. Both of the steam valves 72 and 81 are closed, as is also the chilled-water valve 76. A high-limit thermostat 80 with its bulb located in the room return-air duct is set to the prevailing outside air temperature of, say, 95° F. Below this temperature, the chilled-water valve 76 is under the control of the panel-mounted temperature controller 71 which also has its bulb in the room return-air duct. When the temperature in the room return-air duct exceeds the set point of the high-limit thermostat 80, as it will during cook-out, the chilled-water valve 76 is locked in the position to by-pass the chilled water around the coil 77, and the cooling down of the pasteurization rooms following cook-out is accomplished by using 100 percent of outside supply air.

The panel-mounted pneumatic temperature controller 71, with its bulb located in the room return-air duct, functions to provide control for "normal" and "cook-out" modes of operation. To operate in "normal" mode, the panel-mounted pneumatic selector switch 70 is manually set in the condition shown in FIG. 7. The high-pressure high-temperature steam valve 81 is closed, and the chilled-water valve 76 and the low-pressure low-temperature steam valve 72 are placed under the control of the pneumatic temperature controller 71. The panel-mounted manual gradual positioning switch 93 allows the operator to manually control the relative humidity, and the temperature, by varying the output of the low-pressure steam valve 72.

The freeze detection thermostat 85 having its bulb in the room supply-air duct preceding the cooling coil 77, and being set at 36° F, functions to shut down the supply-air fan 86 and to close the outdoor and exhaust air dampers 51 and 53, when the temperature drops below the set point. The return-air damper 52 remains open and the return-air fan 88 continues to function.

For "cook-out," the panel-mounted pneumatic selector switch 70 is manually placed in the position indicated in phantom in FIG. 7. The high-pressure high-temperature steam valve 81 is now under the control of the panel-mounted manual gradual positioning switch 82 which operates through a pneumatic time-delay relay 94. In the "cook-out" mode, the chilled-water valve 76 and the low-pressure low-temperature steam valve 72 are closed.

For "cook-out," a means of instrumentation is employed to assist the operating engineer to determine the rate that steam should be introduced through the high-pressure steam valve 81 into the pasteurization room. By the instrumentation means, the operating engineer may, with greater accuracy, maintain the rate of increase in temperature and humidity in the pasteurization room within a few degrees of the rise in compost temperature, without adverse effects, such as drying out of the compost.

The instrumentation means just referred to may preferably consist of a plurality, such as six, thermo-couples strategically located in the compost. Each of the thermo-couples is connected through suitable connections and wiring to the central control room panel for each room. In this manner, the compost temperature conditions in each of the pasteurization rooms may be monitored.

By the panel mounted manual positioning switches 82 and 93 which control the high-pressure and low-pressure steam valves 81 and 72, respectively, a high relative humidity, in the range 90–96 percent, may be maintained substantially constant, at, say, 94 %, for 24 hours a day. For this purpose, separate supplies of high-pressure high-temperature and low-pressure low-temperature steam are provided. This steam is introduced into the room air-supply ducts, and by automatic and/or manual controls the desired temperatures and relative humidities are obtained and maintained.

It is to be understood that, by the means described and disclosed herein, each of a plurality of adjacent pasteurizing rooms, each of which may be in a different stage requiring different temperatures and quantities of air, and different relative humidities, may be individually controlled, while supplied by a constant pressure outside ventilation air supply.

What is claimed is:

1. A system of environmental control of the pasteurization of soil or compost or a mixture thereof for the growing of mushrooms and the like, said system comprising:
   a. a plurality of separate rooms each having a plurality of trays of compost or soil or mixture thereof therein;
   b. a constant-pressure outdoor ventilation air supply;
   c. a common air-supply duct and a common air-return duct for distributing said outdoor air to said rooms;
   d. separate supply-air distribution ducts for each room;
   e. separate return-air ducts for each room;
   f. first connecting units between said common air-supply duct and each room supply-air distribution duct;
   g. second connecting units between each room return-air duct and said common air-return duct;
   h. said first connecting units including first blower means, first damper means, steam heating means, and cooling means, for controlling the temperature and humidity of the air passing therethrough;
   i. said second connecting units including second blower means and second damper means;
   j. by-pass means inter-connecting said first and second connecting units;
   k. said by-pass means including third damper means for controlling the recirculation of air;
   l. a first sensing means positioned in said first connecting means beyond said by-pass means for sensing the temperature of the mixed supply and recirculating air;
   m. said first control means being coupled to said first sensing means and to said first, second and third damper means for controlling the positions of said damper means;
   n. second sensing means positioned in said second connecting units for sensing the temperature of the return air passing therethrough; and
   o. second control means coupled to said second sensing means for controlling said steam heating means and cooling means.

2. A system according to claim 1 wherein said steam heating means includes:
   a. a low-pressure steam system;
   b. a high-pressure steam system;
   c. each of said low-pressure and high-pressure systems includes steam jets positioned within said first connecting units;
   d. each of said low-pressure and high-pressure systems includes a control valve.

3. A system according to claim 2 wherein:
   a. said second control means include selector switch means mounted outside of said rooms and adapted to be manually positioned to either "normal" or "cook-out" switch positions.

4. A system according to claim 3 wherein:
   a. said selector switch means when placed in the "normal" switch position couples said second sensing means to said low-pressure steam valve;
   b. said selector switch means when placed in said "cook-out" switch position couples said second sensing means to said high-pressure steam valve.

5. A system according to claim 4 wherein said cooling means includes:
   a. a cooling coil in said first connecting units;
   b. a control valve for said cooling coil.

6. A system according to claim 5 wherein:
   a. high-temperature limit-sensing means are provided in said second connecting units;
   b. means are coupled to said high-temperature limit-sensing means for overriding the control of said second sensing means on said cooling means.

7. A system according to claim 6 wherein:
   a. low-temperature limit-sensing means are provided in said first connecting means adjacent said cooling coil;
   b. means couple said low-temperature limit-sensing means to said first blower means for shutting off said first blower means.

8. A pasteurization room system for the forced growing of mushrooms, said system comprising:
   a. a building having a ground floor, a third floor, and a roof;
   b. a plurality of separate pasteurization rooms on the ground floor;
   c. a plurality of separate pasteurization rooms on the third floor;
   d. vestibule areas on said ground floor and third floor extending along the ends of said pasteurization rooms and separated therefrom;
   e. a ventilation air-supply system on the roof of said building;
   f. common supply duct leading from said ventilation air supply system to said vestibule areas;
   g. a vented supply-air distribution duct in each pasteurization room;
   h. a vented return-air duct in each pasteurization room;
   i. first connections between said each room distribution duct and said common supply air duct;
   j. second connection means between each individual return-air duct and said common return-air duct;
   k. by-pass connection means inter-connecting said first and second connection means;
   l. first blower means in said first connection means for blowing air into said room distribution ducts;
   m. second blower means in said second connecting means for blowing return air into said by-pass connection means and into said common return duct;
   n. cooling means in said first connecting means;
   o. steam heating means in said first connecting means;
   p. first temperature sensing means in said first connecting means;
   q. second temperature sensing means in said second connecting means;
   r. damper means in said first and second connecting means and in said by-pass connecting means;
   s. means coupled to said first temperature sensitive means and to said damper means for controlling said damper means;
   t. means coupled to said second temperature sensing means and to said steam heating means and said cooling means for controlling the application of steam to said first connecting means and for controlling the flow of chilled water through said cooling means.

* * * * *